United States Patent [19]  [11] 4,256,620
Aigner et al.  [45] Mar. 17, 1981

[54] USE OF LOW MOLECULAR WEIGHT OXAZOLINES AS NEUTRALIZING AGENTS FOR ANIONIC WATER-DILUTABLE RESINS

[75] Inventors: Hansjörg Aigner; Klaus Behmel; Johann Luttenberger, all of Graz, Austria

[73] Assignee: Vianova Kunstharz, A.G., Werndorf, Austria

[21] Appl. No.: 695,850

[22] Filed: Jun. 14, 1976

[30] Foreign Application Priority Data

Jun. 17, 1975 [AT] Austria ................................. 4649/75

[51] Int. Cl.³ ...................... C08L 61/20; C08L 33/00
[52] U.S. Cl. .................... 260/29.6 HN; 260/29.4 UA
[58] Field of Search .......... 260/850, 29.2 N, 29.4 UA, 260/29.6 HN, 45.8 NZ, 307 F; 525/418, 450, 451, 909

[56] References Cited

U.S. PATENT DOCUMENTS

| 3,423,349 | 1/1969 | Gagliardi | 260/29.4 R |
| 3,493,635 | 2/1970 | Davis et al. | 260/307 F |
| 3,679,618 | 7/1972 | Lohr | 260/29.4 UA |
| 3,707,584 | 12/1972 | Tulacs | 260/851 |
| 3,959,215 | 5/1976 | Schneider | 260/45.8 NZ |

OTHER PUBLICATIONS

Frump, Chem. Rev. 71, 483, 1971.

Primary Examiner—Lorenzo B. Hayes
Assistant Examiner—Amelia B. Yarbrough
Attorney, Agent, or Firm—A. W. Breiner

[57] ABSTRACT

Use of low molecular weight oxazolines as neutralizing agents for anionic water-dilutable resins is described. Advantages obtained over use of the conventional amines as neutralizers include greater permissible film build-up without adverse results and films having improved water and alkali resistance without detriment to other advantageous properties.

13 Claims, No Drawings

USE OF LOW MOLECULAR WEIGHT OXAZOLINES AS NEUTRALIZING AGENTS FOR ANIONIC WATER-DILUTABLE RESINS

The present invention is concerned with the use of low molecular weight oxazolines as neutralizing agents for anionic water-dilutable resins functioning as binders for coating compositions.

British Pat. No. 1,198,728 and Belgian Pat. No. 708,298 suggest the introduction of oxazoline rings into water-dilutable anionic polymers. In each case the oxazoline ring is a constituent of the macro-molecule and is used to obtain certain film properties. Dilutability with water is achieved in the normal way by neutralization with low molecular amines or amine alcohols. The use of oxazoline rings as the basic center of water-dilutable cationic polymers is taught in Austrian Pat. No. 314,695. Here again the oxazoline ring is an integral part of the macro-molecule. Dilutability with water is obtained by adding inorganic and/or organic acids. Deutsche Offenlegungsschrift No. 1,495,253 describes the use of 2-amine alcohols, raw materials for the preparation of oxazoline compounds, as neutralizing agents for water-dilutable anionic polymers. These amine alcohols, however, do not provide the advantages of the presently disclosed low molecular oxazoline compounds used according to the present invention.

In practice, the amines, particularly secondary or tertiary alkyl or alkanol amines and ammonia are primarily used for neutralizing water-dilutable anionic resins. Amine neutralized systems, however, on the formation of coatings by spraying, dipping, or flow coating and subsequent heat curing show a number of disadvantages. More specifically, owing to the toxicity of volatile amines they give rise to pollution problems and, furthermore, particularly with the low stoving temperatures, the preferred practice, the obtained films have limited water resistance and inadequate resistance to alkali. Such disadvantages are due to the fact that the cured films still contain substantial quantities of the base and greater quantities of acid groups in the unreacted resin moiety. It is a further disadvantage of these systems that, even at relatively low film thickness, there is a strong tendency to wrinkling, splitting, or cracking of the film and, accordingly, the capacity of covering up and hiding irregularities in a substrate by increasing film thickness is very low as compared to conventional paint systems. When amines are used which are non-volatile or of low volatility, at the time of or under the conditions of manufacture and use of the coating pollution is avoided. However, since free basic as well as acidic groups remain in the film in high concentration, water resistance and alkali resistance are not satisfactory. Moreover, reactions with crosslinking components, like aminoplastic resins, which are catalyzed by acids, are strongly inhibited requiring an increase in, or raising of the curing temperatures. In many cases the use of ammonia is ruled out owing, on the one hand, to discoloration of stoving and, on the other hand, to the fact that the stability of blends with incompletely etherified amine resins is substantially reduced by this neutralizing agent.

It is a primary objective of the present invention, therefore, to eliminate the disadvantages incurred with the use of volatile and/or non-volatile nitrogen bases as neutralizing agent for polymers carrying acid groups.

The above-noted disadvantages are avoided according to the present invention by utilizing low molecular oxazoline compounds as neutralizing agents, optionally in conjunction with other bases.

According to the present invention the neutralization of anionic water-soluble resins is accomplished with low molecular oxazoline compounds of the general formula

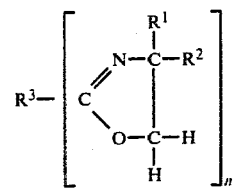

in which n is an integer of from 1 to 4, $R^1$ and $R^2$ are each a monovalent radical of aliphatic and/or cycloaliphatic and/or aromatic and/or heterocyclic hydrocarbons, optionally carrying ether, ester, or hydroxy groups, and $R^3$ is a moiety having a molecular weight of below 500, containing the same groups as $R^1$ and $R^2$, and having a co-valency equal to n or is non-existent, optionally in conjunction with other inorganic or organic bases. Due to their good solubility in water and the capacity to react with the binders in multiple ways, the preferred low molecular oxazolines embraced by the above formula are those wherein $R^1$ and/or $R^2$ and/or $R^3$ carry hydroxy groups. Products wherein $R^1$ or $R^1$ and $R^2$ are methylol groups are particularly preferred. In a variation, in $R^3$ the hydrogen atom in the alpha-positioned C-atom to the oxazoline ring is exchanged partly or wholly by methylol groups.

The low molecular oxazoline compounds of the stated general formula can be produced according to various known methods, e.g., as outlined by B. Wiley and Bennet jr. (Chem. Rev. 44, 447, 1949) and Frump (Chem. Rev. 71, 483, 1971). The preferred low molecular oxazoline compounds are obtained by reaction of carboxylic acids with the accordingly substituted 2-amine alcohols. In addition, through reaction with formaldehyde, and thus exchanging hydrogen, methylol groups can be introduced in $R^3$ at the C-atom in alpha-position to the oxazoline ring. These processes are outlined in detail in "Chemistry and Use of Aminohydroxy Compounds" (Commercial Solvents Corporation, New York, 1969).

The low molecular oxazoline compounds of the cited general formula are, depending on the nature of substituents $R^1$, $R^2$, and $R^3$, liquid to solid substances, some being water-soluble, some being soluble in solvents or solvent/water blends. Table 1 provides a list of the oxazolines used listing the varying constituents thereof and their neutralization equivalent weight. In the general formula:

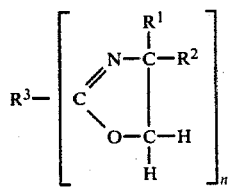

TABLE 1

| Oxazoline Derivative | R₁ | R₂ | R₃ | n | Calculated Neutralization Equivalent Weight | Consistency |
|---|---|---|---|---|---|---|
| Oxazoline I | $CH_2OH$ | $CH_2OH$ | $CH_3-$ | 1 | 145 | liquid, ws. |
| II | $CH_2OH$ | $C_2H_5$ | $CH_3-$ | 1 | 143 | liquid, ws. |
| III | $CH_2OH$ | $CH_2OH$ | –C₆H₄(O)– | 1 | 207 | solid |
| IV | $CH_2OH$ | $CH_2OH$ | t.Bu–C₆H₃(O)– | 1 | 263 | solid |
| V | $CH_2OH$ | $C_2H_5$ | –C₆H₄(O)– | 1 | 205 | solid |
| VI | $CH_2OH$ | $C_2H_5$ | –C₆H₄(O)– | 2 | 166 | solid |
| VII | $CH_2OH$ | $C_2H_5$ | $-CH_2-CH_2-$ | 2 | 156 | liquid, ws. viscous |
| VIII | $CH_2OH$ | $C_2H_5$ | –C₆H₄(O)–, | 2 | 159 | solid |
| IX | $CH_2OH$ | $CH_2OH$ | $-CH_2-CH_2-$/ –C₆H₄(O)– | 1 + 2 | 175 | solid |
| X | $CH_2OH$ | $C_2H_5$ | $-CH(CH_2OH)$ 1-2 | 1 | 203 | liquid, ws. |
| XI | H | H | –C₆H₅ | 1 | 146 | yellow liquid, water insoluble |
| XII | $CH_2OH$ | $CH_2OH$ | — | 2 | 130 | liquid, ws. |
| XIII | $CH_2OH$ | $C_2H_5$ | –C₅H₄N– | 1 | 211 | liquid, water insoluble |
| XIV | $CH_2OH$ | $CH_2OH$ | –C₅H₄N– | 1 | 213 | solid | ws. = water soluble
These compounds can be used in the technical purification state. It is not necessary to have a very high degree of purity.

In using the low molecular oxazolines as neutralizing agents for polymers carrying acid groups according to the present invention, the obtained coatings, in contrast to coatings obtained under the same conditions but using volatile or non-volatile amines, have a much higher water and alkali resistance. Curing temperatures for obtaining the desired film properties can be reduced. Tendency to wrinkling, splitting, or cracking of the film is observed only at much higher film thickness, permitting substantially greater building of the film.

It is theorized that the advantages of using the low molecular oxazoline compounds are due to the reactions typical for the oxazoline ring which, through hydrolysis, is transformed to the corresponding acid amide and, further, to the ester amide through acidolysis. Thus, the cured film contains a low level of basic and acid groups. Further advantages apparently are that neutralized resin solutions with pH-values of below 7 can be obtained as a result of the relatively low basicity of 2-oxazolines. This, in turn, allows the formulation of metallic enamels with aluminum pigments. Because of the low basicity of the compounds used according to the invention, higher quantities of low molecular oxazolines are required to obtain water dilutability of the carboxy group containing binders. In most cases, 1-2 equivalents of oxazoline for 1 equivalent of carboxy groups are used to obtain satisfactory water dilutability.

The following binders are used in the following examples:

BINDER A

An oil-free saturated alkyd resin based on branched synthetic fatty acids with 9-11 C-atoms having an acid number of 50-55 mg KOH/g; DIN 53,183, 75% in solvents, viscosity 100-130 s, DIN 53,211, 55% in solvent blend having cross-linking capabilities for use in stoving enamels.

BINDER B

An oil-free, saturated alkyd resin based on neopentylglycol, triethylene glycol, diethylene glycol, adipic acid, trimellitic acid, acid number 45 mg KOH/g, 83% in ethylene glycol monoethylether, having a viscosity of 50-70 s, DIN 53,211, diluted to 50% with ethylene glycol monobutyl ether having cross-linking capabilities for use in stoving enamels.

BINDER C

An alkyd resin which has synthetic carboxylic acid content, and fatty acid content of 58%, and an acid value of 100-130 mg KOH/g. At 75% solids in a solvent blend it has a viscosity of 460-540 P at 20° C.

BINDER D

An acrylic copolymer which is thermosetting and made according to Example 4 of U.S. Pat. No. 3,707,584 having an acid value of 30-35, DIN 53,183, 55% in solvent blend. Viscosity 300-400 s, DIN 53,211.

Table 2 gives degree of neutralization, pH-value, water/solvent blend of a 20% solution of the binder, and the appearance of this neutralized resin solution. The degree of neutralization means the quantity in percent of the carboxy groups neutralized with oxazoline. The calculation basis is the neutralization equivalent of the low molecular oxazolines listed in Table 1. As can be seen from Table 2, the pH-values of the 20% aqueous solutions are hardly above neutral or in the slightly acidic range. The higher level of solvents required for may also serve as the cross-linker in addition to functioning as a neutralizer.

TABLE 2

| | | | Preparation of neutralized resin solutions of Binders A - D. | | | |
|---|---|---|---|---|---|---|
| Example | Binder | Neutralizing Agent (Table 1) | Degree of Neutralization (%COOH-groups Neutralized) | pH, 20% Aqueous Solution (+) | $H_2O$/solvent, 20% Solids | Appearance of 20% Aqueous Solution |
| 1.1 | A | TEA | 90 | 8.2 | 60/40 | clear (Comparison) |
| 1.2 | A | DMEA | 90 | 8.0 | 60/40 | clear (Comparison) |
| 1.3 | A | I | 150 | 6.35 | 60/40 | slightly opaque |
| 1.4 | A | I | 200 | 6.5 | 60/40 | clear |
| 1.5 | A | I + DMEA | 160 + 10 | 6.9 | 65/35 | clear |
| 1.6 | A | II | 200 | 7.0 | 70/30 | clear |
| 1.7 | A | XII | 150 | 7.0 | 71/29 | clear |
| 1.8 | A | XII | 200 | 7.2 | 68/32 | clear |
| 1.9 | A | III | 150 | 5.8 | 35/65 | clear |
| 1.10 | A | III | 200 | 5.9 | 35/65 | clear |
| 1.11 | A | XI | 150 | 6.9 | 37/63 | clear |
| 1.12 | A | XI | 200 | 6.95 | 40/60 | clear |
| 1.13 | A | VII | 150 | 6.2 | 40/60 | opaque |
| 1.14 | A | VII | 200 | 6.4 | 47/53 | opaque |
| 2.1 | B | $NH_3$ | 90 | 7.6 | 95/5 | clear (Comparison) |
| 2.2 | B | TEA | 90 | 8.2 | 95/5 | clear (Comparison) |
| 2.3 | B | DMEA | 90 | 8.0 | 95/5 | clear (Comparison) |
| 2.4 | B | I | 150 | 5.2 | 95/5 | strongly opaque |
| 2.5 | B | I + $NH_3$ | 150 + 10 | 5.6 | | almost clear |
| | | | 200 | 7.0 | 95/5 | |
| 2.6 | B | XII | 200 | 6.7 | 92/8 | clear |
| | | | 150 | 6.4 | 90/10 | clear |
| 2.7 | B | II | 150 | 6.8 | 95/5 | clear |
| | | | 200 | 6.95 | 95/5 | clear |
| | | | 250 | 7.5 | 95/5 | clear |
| 2.8 | B | XI | 100 | 6.9 | 57/43 | clear |
| | | | | | 66/33 | opaque |
| | | | 150 | 7.0 | 38/62 | clear |
| | | | 200 | 7.2 | 51/49 | clear |
| | | | | | 33/66 | opaque |
| 2.9 | B | III | 150 | 5.8 | 60/40 | clear |
| 2.10 | B | VI | 200 | 6.2 | 60/40 | clear |
| 2.11 | B | VII | 150 | 6.3 | 70/30 | clear |
| 2.12 | B | VII | 200 | 6.35 | 75/25 | clear |
| 2.13 | B | IX | 150 | 5.6 | 66/33 | clear |
| 2.14 | B | IX | 200 | 5.8 | 75/25 | clear |
| 2.15 | B | X | 150 | 4.6 | 50/50 | clear |
| 2.16 | B | X | 200 | 4.8 | 60/40 | clear |
| 2.17 | B | XIII | 100 | 5.6 | 55/45 | clear |
| 2.18 | B | XIII | 150 | 6.6 | 57/43 | clear |
| 2.19 | B | XIII | 200 | 7.0 | 60/40 | clear |
| 2.20 | B | XIV | 200 | 6.4 | 20/80 | slightly opaque |
| 3.1 | C | I | 150 | 6.3 | 60/40 | almost clear |
| | | | 200 | 6.4 | 70/30 | almost clear |
| 3.2 | C | II | 150 | 6.4 | 50/50 | clear |
| 3.3 | C | VI | 150 | 6.6 | 40/60 | clear |
| 3.4 | C | X | 150 | 5.9 | 42/58 | clear |
| 3.5 | C | XII | 150 | 6.7 | 50/50 | opaque solution |
| 3.6 | C | XIII | 200 | 7.3 | 40/60 | clear |
| 3.7 | C | TEA | 90 | 8.4 | 66/33 | clear (Comparison) |
| 4.1 | D | II | 200 | 6.5 | 30/70 | clear |
| 4.2 | D | VII | 200 | 6.55 | 30/70 | clear |
| 4.3 | D | X | 200 | 6.0 | 30/70 | clear |
| 4.4 | D | XII | 150 | 5.2 | 25/75 | clear |
| | | | 200 | 5.6 | 30/70 | clear |
| 4.5 | D | DMEA | 90 | 9.5 | 50/50 | clear (Comparison) |

Key to Table 2:
(+) measured with glass electrode, 24 hours after neutralization
TEA = triethylamine
DMEA = dimethylethylamine
$NH_3$ = ammonia clear aqueous solutions with 20% solids can be explained by the low solubility in water of some oxazoline compounds which become water tolerable in strongly diluted organic solvent solutions only. For liquid water-soluble oxazolines no, or low levels of auxiliary solvents are required, and these are the preferred neutralizing agents. Water-insoluble oxazolines, liquid or solid, are incorporated into the binder, dissolved or molten, which thereupon becomes dilutable with water. Water-insoluble oxazolines can be rendered water-soluble through cautious condensation with a hexaalkoxymethylmelamine. Such precondensates of low molecular oxazolines with, e.g., hexamethoxymethylmelamine,

EXAMPLES 5-8: UNPIGMENTED VARNISHES

EXAMPLE 5

13.3 g of Binder A are diluted with 6.7 g of ethylene glycolmonoethylether and neutralized with 4.3 g of a 60% aqueous solution of Oxazoline I. Upon addition of 2.5 g of hexamethoxymethylmelamine and 10 g of water a clear solution forms which is stoved in an air circulation oven at 150° C. for 30 minutes to give a clear, hard, and flexible film.

EXAMPLE 6

3.1 g Oxazoline IX are melted or dissolved in 12 g of Binder B. 5 g of hexamethoxymethylmelamine are added. The resin blend is diluted with 18 g of water to give a clear solution which, when cured in an oven at 150° C. (30 min. baking time) gives an excellent film.

EXAMPLE 7

13.3 g of Binder C are neutralized with 4.9 g of Oxazoline II. 5 g of hexamethoxymethylmelamine are added and the resin is diluted with 6.7 g of ethylglycol and 10 g of water. The clear paint solution is applied by blade to a glass plate and cured at 140° C. for 30 minutes; a clear, hard film is obtained.

EXAMPLE 8

18.2 g of Binder D are neutralized with 1.6 g of Oxazoline XII and diluted with 10 g of water. The clear varnish is cured in an air circulation oven at 175° C. for 20 minutes; a hard flexible film is obtained.

EXAMPLES 9-18: PIGMENTED PAINTS AND COMPARATIVE TESTS

EXAMPLE 9

80 g of $TiO_2$, Rutile type, are let down twice over a triple roll mill in 40% of a binder solution obtained from 96.5 g of Binder B, 20 g of hexamethoxymethylmelamine, and 15.4 g of Oxazoline II. The mill base is completed with the remainder of the binder solution and diluted to application viscosity of 40 s DIN 53,211 by vigorous stirring with 126 g of deionized water. The paint is sprayed onto degreased steel, allowed to flash-off for 10 minutes and cured at 130° C. and 150° C. for 30 minutes in an air circulation oven.

A comparison paint was formulated using 5.5 g of dimethylethanol amine instead of Oxazoline II and cured in the same way.

For testing water solubility, the samples were immersed into deionized water of 40° C. and, additionally, a cotton pad soaked with water at 20° C. was placed thereon. The time after which blisters appear is reported.

| Test | Stoving Temperature | Example 9 | Comparison Example |
|---|---|---|---|
| Immersion Test | 130° C. | 48 hours | 24 hours |
| 40° C. | 150° C. | 144 hours | 48 hours |
| Cotton Pad Test | 130° C. | 240 hours | 96 hours |
| 20° C. | 150° C. | 240 hours | 100 hours |

EXAMPLE 10

67 g of Binder A are diluted with 33 g of sec butanol and neutralized with 14.5 g of Oxazoline VII. After addition of 16.2 g of hexamethoxymethylmelamine, the blend is diluted with 30 g of deionized water. With a dissolver, 81.7 g $TiO_2$ (Rutile) are dispersed in this binder solution. Then 40 g of deionized water are incorporated to dilute the paste to spraying viscosity of 36 s DIN 53,211. The paint is applied by spraying to decreased steel panels and after 10 minutes of flash-off cured at 150° C. for 30 minutes.

A comparison paint is prepared by using 3.75 g of DMEA instead of Oxazoline VII and applied and cured under equivalent conditions. While the comparison paint has poor covering power and has a tendency to wrinkle, split, or crack with a film thickness of more than 35 μm, Example 10 permits a high film build-up, free from wrinkles, splits, and cracks up to a film thickness of 60 μm.

EXAMPLE 11

67 g of Binder C are diluted with 33 g of ethylglycol and neutralized with 47.7 g of a 60% solution in methylglycol of Oxazoline VI. After addition of 22.4 g of a commercially available partially methanol etherified melamine formaldehyde resin (62% in solvent/water blend) and 0.1 g of an available flow agent, the blend is diluted with 30 g of deionized water. About 40% of this binder blend are used to disperse 92.5 g of $TiO_2$ (Rutile) on a three roll mill. The paint is completed and diluted to spraying viscosity of 35 s DIN 53,211 with 68 g of a 1:1 blend of water and ethylglycol. The pH-value of the paint is 5.7 and is adjusted to 7.0 with 1.7 g of triethylamine. At this pH-value, the content of volatile amine is one-fifth of that of an equal paint neutralized solely with triethylamine.

The spraying paint according to this Example 11 and the paint neutralized with triethylamine only is applied to a steel panel and after 20 minutes of flash-off is cured at 120° C. for 30 minutes in an air circulation oven. A high gloss flexible film results.

EXAMPLE 12

The resin solution described in Example 11 is neutralized with 24.6 g of Oxazoline II. With a dry film thickness of 30 μm, the film has a König pendulum hardness of 102 s, the film of Example 10 one of 142 s and the film of an equivalent paint but neutralized with TEA a pendulum hardness of 78 s.

EXAMPLE 13

45 g of Binder D are neutralized with 8.8 g of Oxazoline VII and ground with 50.4 g of $TiO_2$ (Rutile). The paste is diluted with 10 g of isopropanol and 20 g of deionized water to 170 s DIN 53,211. The paint, having a pH-value of 7.0, is applied to passivated steel with a blade and cured for 20 minutes at 180° C. in an air circulation oven.

A comparison paint neutralized with 1.9 of dimethylethanol amine instead of Oxazoline VII is cured under the same conditions. The coated panels are immersed in a 1% detergent solution of 74° C. in a closed container. After 3 and 18 hours, no negative influences could be observed with respect to the oxazoline neutralized solutions of Example 13. However, the comparison panels showed adverse effects after 3x 18 hours.

EXAMPLE 14

126.5 g of Binder A are neutralized with 24 g of Oxazoline II. 5 g of hexamethoxymethylmelamine and 100 g of $TiO_2$ (Rutile) are added and the paste is twice passed over the three roll mill. The paste is diluted to 160 s DIN 53,211 with a 4:1 blend of water and butylglycol and the paint is applied by a blade with an aperture of 50 μm to tin plate of 0.3 mm. Without flash-off, the panels are stoved at 240° C. for 2, 3, and 4 minutes, respectively, in an air circulation oven. The coatings have good deep drawing properties and pasteurizing resistance in deionized water. They compare with coatings on comparison paints neutralized with only 7 g of DMEA instead of the stated amount of Oxazoline II.

EXAMPLE 15

360 g of Binder B are neutralized with 116 g of Oxazoline XII and diluted with 264 g of deionized water. 260 g of this resin solution are ground on a three roll mill together with 400 g of TiO₂ (Rutile) and the paste is completed with 440 g of the resin solution, 150 g of hexamethoxymethylmelamine, and 50 g of a liquid epoxy resin on cyclohexylmethylcyclohexanocarboxylate with a dynamic viscosity of 350-450 cp and an epoxy equivalent of 130 to 136, to form a stoving paint. Application viscosity of 40 s DIN 53,211 is obtained by adding 450 g of deionized water. Upon storage of 3 weeks at room temperature just a slight rise in viscosity is reported and can be set off by adding water, while the same paint formulation neutralized with 27 g of TEA instead of oxazoline gelled after the same time.

The spraying paint according to Example 15 is sprayed onto 0.8 mm steel panels and cured at 170° C. for 30 minutes. An otherwise equivalent comparison paint but without the epoxy resin is applied under the same conditions. The following results are obtained:

|  | Example 15 | Comparison Example |
|---|---|---|
| Dry film thickness | 50 μm | 45 μm |
| Cross hatch DIN 53 151 | 2 | 5 |
| Erichsen indentation DIN 53 156 | 4.4 mm | 0.8 mm |
| Konig pendulum hardness DIN 53 157 | 187 s | 195 s |
| Gardner impact | 40/10 | 27/0 |

EXAMPLE 16

45 g portions of Binder D are each neutralized, respectively, with 8 g of Oxazoline II and 11.4 g of Oxazoline X, diluted with 10 g of isopropanol and 25 g of water and ground with 49.2 g and 54.4 g of TiO₂ (Rutile). The paints were applied to glass plates with a blade and cured 20 minutes at 175° C. A comparison paint neutralized with 2 g of DMEA was cured under the same conditions. The latter had a König pendulum hardness of 87 s at a film thickness of 20 μm, while the paint with Oxazoline II had 110 s/22 μm and the paint with Oxazoline X had 124 s/21 μm.

EXAMPLE 17

40 g of Binder A are diluted with 20 g of ethylglycol and neutralized with 13 g of a 60% aqueous solution of Oxazoline I. The blend was mixed with 15 g of hexamethoxymethylmelamine and diluted with 80 g of water. A clear varnish solution with a viscosity of 35 s DIN 53,211 and a pH-value of 6.5 was obtained.

Liquid pigment preparations and aluminum pastes commercially available were incorporated with a high speed dissolver. Stable paints resulted which did not form hydrogen on storage and which gave a good metallic effect on spraying and curing.

EXAMPLE 18

60.5 g of Binder B are neutralized with 25 g of a precondensate formed by reacting for 2 hours at 80° C. 32 g of hexamethoxymethylmelamine and 28.6 g of Oxazoline II. The blend is ground with 75 g of TiO₂ on a three roll mill and diluted to a viscosity of 33 s DIN 53,211 with 95 g of deionized water. The paint was sprayed onto steel panels and stoved for 30 minutes at 130° C. in an air circulation oven.

Evaluation of the films according to this Example 18 and a comparison paint of Example 9 gave no significant differences:

| Example | Konig Pendulum Hardness | Erichsen Indentation | Gardner Impact | Crosshatch DIN 53 151 | Water Immersion (40° C.) |
|---|---|---|---|---|---|
| Example 18 | 190s/28 μm | 5.7 mm | 80/50ips | 1-2 | 48 hours |
| Example 9 | 192s/30 μm | 5.6 mm | 70/60ips | 1-2 | 48 hours |

This example shows that low molecular oxazolines through precondensation with hexamethoxymethylmelamine attain enhanced water solubility, which entrains consumption of less water or higher solids in the spray dilution.

NEUTRALIZATION OF A WATER EMULSIFIABLE ALKYD RESIN

EXAMPLE 19

19 g of water emulsifiable alkyd resin containing 9% of polyethyleneglycol, with an acid number of 15 mg KOH/g and a hydroxy value of 150 mg KOH/g, are neutralized with 9 g of Oxazoline VII and emulsified with 65 g of distilled water at low stirring speed. A stable emulsion is obtained which can be dispersed with pigments and can be processed by adding a melamine formaldehyde resin to provide a stoving enamel which when cured at 120°-140° C. provides a deep gloss film with excellent flow.

A spraying enamel is formulated from 60 g of the above emulsion, 20 g of a melamine formaldehyde resin (75% in iso-butanol), 40 g of TiO₂ (Rutile), 3 g of butyldiglycol and 40 g of deionized water. The paint has a viscosity of 18 s DIN 53,211 and is sprayed onto steel panels and cured for 30 minutes at 130° C. in an air drying circulation oven. A comparison is prepared by neutralization with triethylamine instead of Oxazoline VII and processed under the same conditions. Deep gloss films are obtained. On stoving, the film according to Example 19 showed no cissing at a resulting dry film thickness of 40 μm, while the comparison paint showed cissing at a dry film thickness of 25 μm or more.

As will be apparent to one skilled in the art, various modifications can be made within the scope of the aforesaid description. Such modifications being within the ability of one skilled in the art form a part of the present invention and are embraced by the appended claims.

It is claimed:

1. Method of forming an aqueous solution of an anionic resin including neutralizing said resin with low molecular oxazoline compounds of the formula

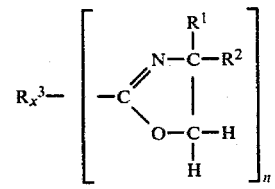

wherein n is an integer of from 1 to 4, $R^1$ and $R^2$ are each the same or different monovalent radicals of aliphatic, cycloaliphatic, aromatic, or heterocyclic hydrocarbons, and $R^3$ is a radical with a molecular weight of below 500, containing the same groups as $R^1$ and $R^2$, and x is equal to n or zero, n being 2 when x is zero.

2. Method according to claim 1 wherein $R^1$, $R^2$, and $R^3$ carry hydroxy groups.

3. Method according to claim 1 wherein $R^1$ or $R^1$ and $R^2$ carry methylol groups.

4. Method according to claim 1 wherein the hydrogen atoms at the alpha-position C-atom are partially or wholly replaced by methylol groups.

5. Method according to claim 1 wherein in the neutralization of the carboxy groups of the anionic resin, for each carboxy equivalent, 1 to 2 oxazoline equivalents are used.

6. Method according to claim 1 wherein the oxazoline compound is a partial condensation product with a hexaalkoxymethylmelamine.

7. Method according to claim 1 wherein $R^1$, $R^2$, and $R^3$ carry ether or ester groups.

8. Method according to claim 1 wherein x is equal to n.

9. An aqueous solution of a water-dilutable anionic resin neutralized with low molecular oxazoline compounds of the formula

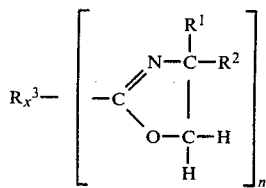

wherein n is an integer of from 1 to 4, $R^1$ and $R^2$ are each the same or different monovalent radicals of aliphatic, cycloaliphatic, aromatic, or heterocyclic hydrocarbons, and $R^3$ is a radical with a molecular weight of below 500, containing the same groups as $R^1$ and $R^2$, and x is equal to n or zero, n being 2 when x is zero.

10. The aqueous solution according to claim 9 wherein $R^1$ or $R^1$ and $R^2$ carry methylol groups.

11. The aqueous solution according to claim 9 wherein the hydrogen atoms at the alpha-position C-atom are partially or wholly replaced by methylol groups.

12. The aqueous solution according to claim 9 wherein in the neutralization of the carboxy groups of the anionic resin, for each carboxy equivalent, 1 to 2 oxazoline equivalents are used.

13. The aqueous solution according to claim 9 wherein the oxazoline compound is a partial condensation product with a hexaalkoxymethylmelamine.

* * * * *